United States Patent [19]

Itoh

[11] Patent Number: 5,003,633
[45] Date of Patent: Apr. 2, 1991

[54] FACE PROTECTOR

[75] Inventor: Akira Itoh, Komae, Japan

[73] Assignee: Itoh Seiki Co., Ltd., Tokyo, Japan

[21] Appl. No.: 422,832

[22] Filed: Oct. 17, 1989

[30] Foreign Application Priority Data

Jun. 2, 1989 [JP] Japan ................:................ 1-140693

[51] Int. Cl.$^5$ ....................,.. A62B 7/10; A62B 18/00
[52] U.S. Cl. ...................................... 2/9; 128/206.21; 128/206.24
[58] Field of Search ....................... 128/206.12, 206.21, 128/206.24; 2/206, 173, 424, 428, 425, 9

[56] References Cited

U.S. PATENT DOCUMENTS

| | | | |
|---|---|---|---|
| 2,875,759 | 3/1959 | Galleher, Jr. | 128/206.24 |
| 2,877,764 | 3/1959 | Galleher, Jr. | 128/206.24 |
| 4,114,197 | 9/1978 | Morton | 2/423 |
| 4,288,268 | 9/1981 | Hartung | 2/425 |
| 4,296,746 | 10/1981 | Mason, Jr. et al. | 128/206.24 |
| 4,345,338 | 8/1982 | Frieder, Jr. et al. | 2/425 |
| 4,665,570 | 5/1987 | Davis | 2/428 |
| 4,951,664 | 8/1990 | Niemeyer | 128/206.24 |

Primary Examiner—Werner H. Schroeder
Assistant Examiner—Michael A. Neas
Attorney, Agent, or Firm—Diller, Ramik & Wight

[57] ABSTRACT

There is provided a seal device for a face protector such as respirators used in a state fitted closely to a user's face which includes a seal member formed by using the user's face as a mold, an airtight elastic member provided between the seal member and the face portector and an airtight elastic member secured to the surface of the seal member on the side of the user's face. There is also provided a face protector having this seal device mounted on a face protector main body which is worn by a user in a state fitted to the user's face. There is further provided a method for forming a seal device for a face protector including steps of heating, at a relatively low temperature, a material which is softened when heated at the relatively low temperature and hardens at room temperature, placing the heated and softened material on a user's face and manually forming the material into a seal member in conformity with contour of the user's face and cooling the seal member until it hardens, and securing airtight elastic members on both sides of the seal member.

6 Claims, 3 Drawing Sheets

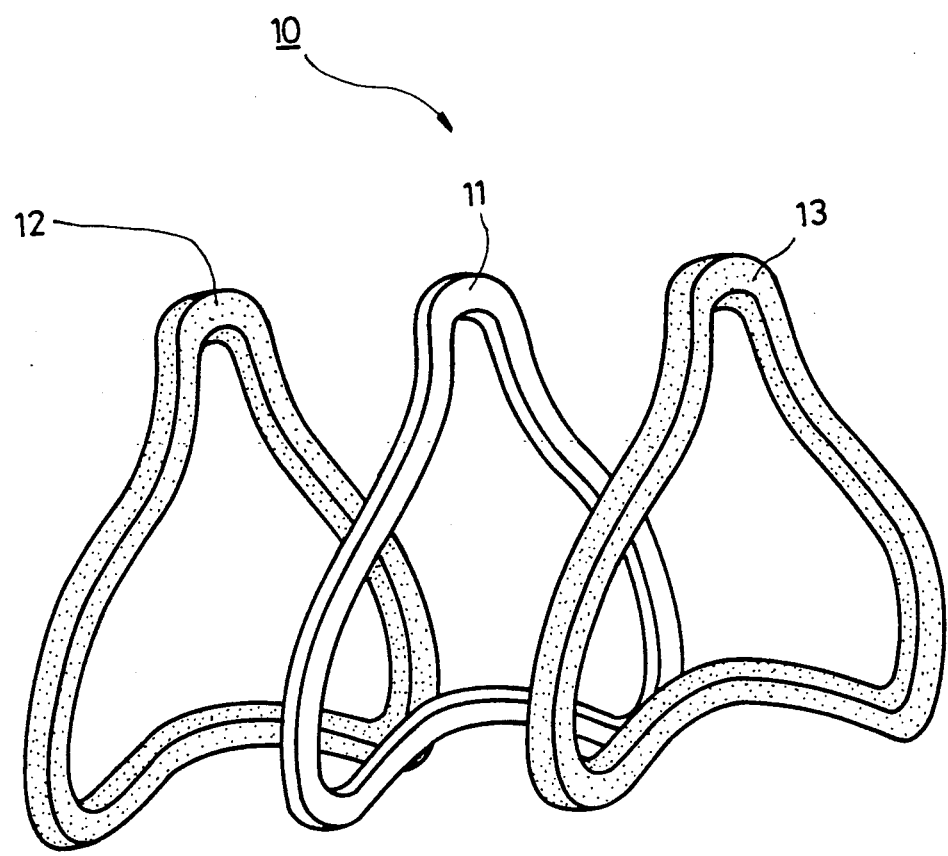
F I G. 1

FACE PROTECTOR

BACKGROUND OF THE INVENTION

This invention relates to a face protector, a seal device for a face protector and a method for making such seal device and, more particularly, to a seal device for a face protector having an improved fitness to the user's face.

Various face protectors are used for securing safety for a person working in an adverse or dangerous environment. For protecting the respiratory system, for example, respiratory system protectors including a dust proof mask, a gas mask, an air supply mask, an air respirator and an oxygen respirator are used. For protecting eyes, for another example, protectors including a shading protector and eye protecting glasses for welding are used. There are also some protectors having these functions of protecting the respiratory system and eyes combined together.

The face protectors such as these respiratory system protectors and eye protecting glasses which are worn by users must be fitted closely to their face and there should be no leakage between the protectors and their face. Otherwise, the function of the face protectors would not be performed fully and an adequate level of safety would not be secured.

A respiratory system protector in the form of a half face mask covering the user's mouth and nose, for example, must be completely sealed in its peripheral portion because otherwise concentration of newly supplied air or oxygen would not be maintained at a predetermined value.

For improving seal characteristics of such half face mask, the prior art half face mask is provided with a seal member made of an elastic material such as rubber at the peripheral portion of the mask and, besides, masks of many sizes are prepared for enabling the user to choose a mask of an optimum shape and size which fits his face most closely.

Since, however, the contour and skeletal structure of the user's face differs in minute details from one person to another, the prior art half face mask which is adapted to fit the user's face by utilizing elasticity of the seal member and choosing a suitable one from masks of various sizes is still insufficient for satisfying all users of the mask in wearing the mask in an adequately fitted state.

A safety measure is taken to cope with such situation by conducting a fitting test for masks by a relevant organization or by conducting a mask wearing training for persons who want to wear the masks. Thus, fitting of face protectors is a great problem for manufacturers as well as users of the face protectors.

For coping with the situation, it is conceivable to increase the types of masks or manufacture a mask in conformity with the face of an individual user. These measures however are not practicable because they will require molds for forming masks and this will require a long period of time in completing masks and will also be very costly.

It is also conceivable to make a mold for a mask by placing a lump of plaster on a user's face and forming this plaster into a mold in conformity with his face. This method however has the problems that it takes a long time before the plaster mold hardens and that it is extremely difficult for the user to form such plaster mold by himself without assistance by other person.

An improvement in straps attached to these face protectors is also proposed in addition to the improvement in the face protector themselves but a remarkable success has not been reported yet.

It is, therefore, an object of the invention to provide a seal device for a face protector capable of fitting a face protector to the user's face closely regardless of difference in the contour or skeletal structure of the user's face from one user to another.

It is another object of the invention to provide a face protector having such seal device.

It is still another object of the invention to provide a method for forming such seal device for a face protector.

SUMMARY OF THE INVENTION

A seal device for a face protector achieving the above described first object of the invention comprises a seal member formed by using the user's face as a mold, an airtight elastic member provided between the seal member and the face protector and an airtight elastic member secured to the surface of the seal member on the side of the user's face.

According to the seal device of the invention, the seal member is formed by using the user's face as a mold so that the seal member has an excellent sealing property and, besides, the space between the seal member and the user's face and the space between the seal member and the face protector are respectively sealed with the airtight elastic members whereby a complete fitness of the face protector to the user's face can be achieved.

A face protector achieving the second object of the invention comprises the seal device as described above mounted on a face protector main body which is worn by a user in a state fitted to the user's face.

According to the invention, the face protector has a seal surface formed in conformity with the contour of the user's face so that the face protector can be fitted completely to the user's face regardless of the shape of the face protector.

A method for forming a seal device for a face protector achieving the third object of the invention comprises steps of heating, at a relatively low temperature, a material which is softened when heated at the relatively low temperature and hardens at a room temperature, placing the heated and softened material on a user's face and manually forming the material into a seal member in conformity with contour of the user's face and cooling the seal member until it hardens, and securing airtight elastic members on both sides of the seal member.

According to the method of the invention, a material which is softend by heating at a relatively low temperature and hardens by subsequent cooling, e.g., a shape memorizing resin, is heated to a relatively low temperature of about 40° to 65° C. and placed on the user's face whereby the seal member is formed by using the user's face as a mold. Then, airtight elastic members made of such material as rubber or closed cell urethane are secured to the seal member for providing linings thereto. Thus, the seal device in faithful conformity with the contour or skeletal structure of the user's face can be formed in a simple manner.

Embodiments of the invention will now be described with reference to the accompanying drawings.

BRIEF DESCRIPTION OF THE DRAWINGS

In the accompanying drawings,

FIG. 1 is an exploded perspective view of an embodiment of the invention in which the seal device for a face protector according to the invention has been applied to a half face mask;

DESCRIPTION OF PREFERRED EMBODIMENTS

Figure 2:
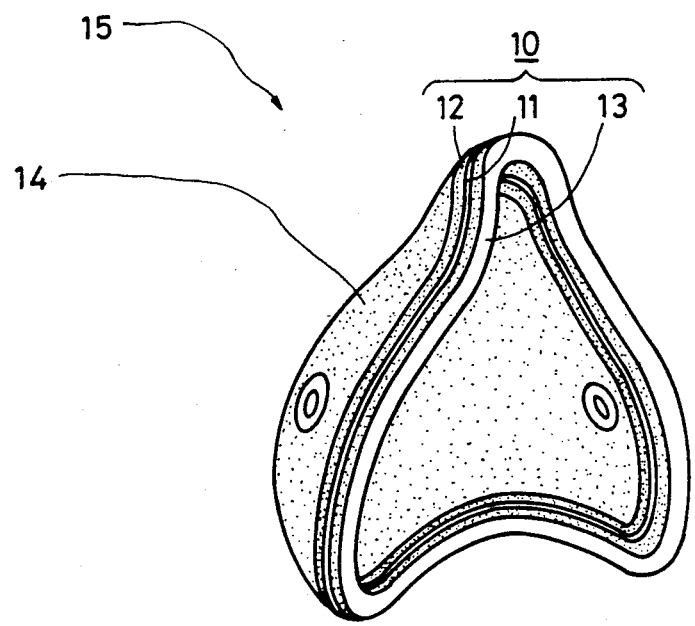
FIG. 2 is a perspective view of an embodiment of the invention in which the face protector having the seal device according to the invention has been applied to a half face mask.

Referring first to FIG. 1, a seal device 10 for a face protector which is applied to a half face mask consists of a seal member 11 which constitutes a frame of the seal device 10 and airtight elastic members 12 and 13 which are secured to both sides of the seal member 11 and sealing the space between the seal device 10 and the user's face and the space between the seal device 10 and a face protector main body 14 (FIG. 2).

This seal member 11 is the most important part of the seal device for fitting a half face mask to the user's face. If the seal member 11 is not in strict conformity with the contour of the user's face, a gap will be formed between the seal device and the user's face notwithstanding that the airtight elastic members 12 and 13 are provided on both sides of the seal member with resulting difficulty in obtaining a complete sealing between the seal device and the user's face.

It is an important feature of the invention that the seal member 11 is formed by using the user's face as a mold. The seal member may be formed either by using the user's face directly as a primary mold or by using a secondary mold formed after such primary mold. In either case, the seal member 11 is formed in strict conformity with the contour of face of each individual user of the half face mask.

In case of forming the seal member 11 by directly using the user's face as a mold, a material such as a conventionally used thermoplastic resin which must be heated to a relatively high temperature for softening and which besides requires a metal mold for forming is unsuitable for a material of the seal member 11. As a material of the seal member 11, a material which is softened when heated at a relatively low temperature of 40° to 65° C., i.e., a temperature range in which the user will not feel too hot when the material is in contact with his face, and yet hardens at room temperature is preferable. As such material, a shape memorizing resin or shape memorizing alloy which is commercially available in the market may be used. In a case of forming the seal member 11 by using a secondary mold formed after a primary mold, not only the shape memorizing resin or alloy but also a material such as a thermoplastic resin which is softened at a higher termperature and hardens at room temperature may be used as the material of the seal member 11.

In forming the seal member 11, a heated and softened material is placed on the user's face and formed into a shape in conformity with the contour of the user's face. The material then is cooled until it hardens and removed from the user's face as the completed seal member 11 (a specific method for forming the seal member 11 will be described later).

The airtight elastic members 12 and 13 are secured, by means of bonding or the like, to both sides of the seal member 11 formed in the above described manner in conformity with the user's face. The airtight elastic members 12 and 13 perform the function of sealing the space between the seal member 11 and the half face mask and the space between the seal member 11 and the user's face. As the airtight elastic members 12 and 13, a material which is both elastic and soft such as rubber or closed cell resin is preferably used.

Figure 3:
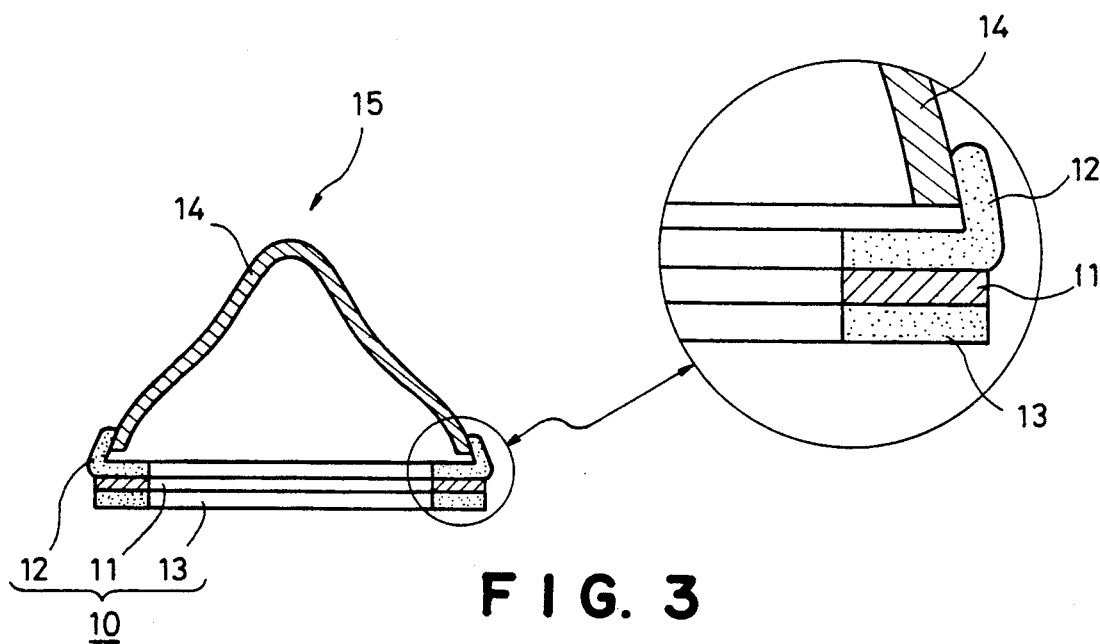
FIG. 3 is a cross-sectional view of the embodiment of FIG. 2.
Figure 4A:
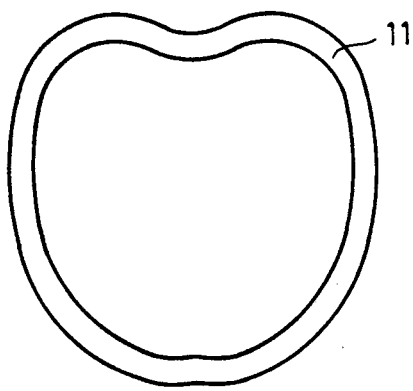
FIG. 4 (a) through (e) is a view showing an embodiment in which the method for forming the seal device according to the invention has been applied to forming of a half face mask.
Figure 4D:
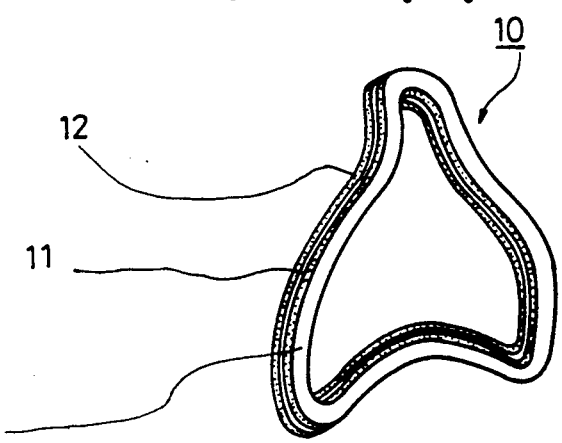
Figure 4B:
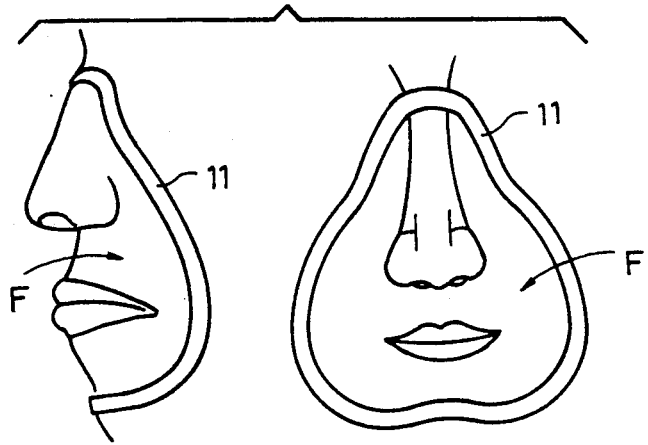
Figure 4E:
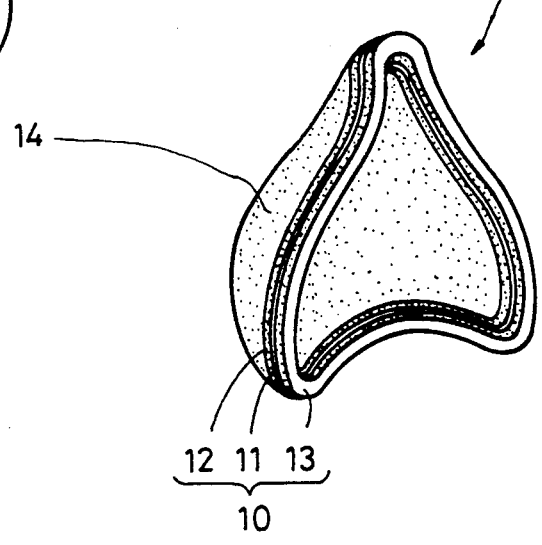
Figure 4C:
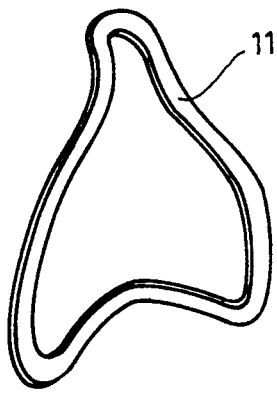

The seal device 10 consisting of the seal member 11 and the airtight elastic members 12 and 13 is secured, as shown in FIGS. 2 and 3, to a face protector main body 14 of a half face mask by bonding the airtight elastic member 12 to the face protector main body 14 and a half face mask 15 is thereby completed.

Since the seal member 11 of the seal device 10 is of a shape in strict conformity with the contour of the user's face and the airtight elastic members 12 and 13 are secured to the seal member 11, the seal device 10 can be used in complete fitness with the user's face.

The face protector 15 such as a half face mask comprising the seal device 10 can be used in complete fitness with the user's face by virtue of the seal device 10 even if the shape of the edge portion of the face protector main body 14 is not in conformity with the contour of the user's face.

A specific example of the method for forming the seal device according to the invention will now be described with reference to FIG. 4 (a) through (e).

Referring first to FIG. 4 (a), as the seal member 11, a metal or resin such as a shape memorizing resin or shape memorizing alloy which is softened at a relatively low temperature within a range of 40° to 65° C. and hardens at room temperature is selected.

Then an annular seal member 11 corresponding roughly to the shape of a part of the user's face to be sealed is formed from a plate-like member of the above selected material. A plurality of such annular seal members 11 of different sizes may be prepared so that the user can select a suitable one from among them.

If a shape memorizing resin is used as the seal member 11, it is not important for the shape memorizing resin to have a shape memorizing effect but it is the property that it is softened at a relatively low heating temperature and hardens at room temperature that is really important. Therefore, any other material may be used as the seal member 11 if it has such property.

Next (FIG. 4) (b), the annular seal member 11 is heated to a predetermined temperature by, for example, immersing it in hot water until it is softened. The user places the softened annular seal member 11 on a part of his face F which is to be covered with the half face mask 15 and presses the annular seal member 11 to his face F to form the seal member 11 to a shape by using his face F as a mold. Then, he waits in this state until the formed seal member 11 is cooled and hardens. The hardened seal member 11 has a three dimensional form which is in substantial conformity with the user's face F (see FIG. 4 (c).

If it is necessary to adjust the shape of the thus formed seal member 11, the user may adjust the shape by placing a warmed face towel on the seal member 11 to allow it to conform more exactly to the contour of his face F while having the formed seal member 11 still on his face and then wait until the seal member 11 is cooled into the seal member 11 which fits his face F completely.

In a case where the face protector having the seal device 10 is used in an environment of a temperature which is higher than the softening temperature of the material of the seal member 11, a special treatment of the seal member 11 after the forming thereof will be necessary so as to prevent the seal member 11 from restoring to its original annular shape or otherwise deforming.

If the face protector is used in an environment of a temperature which is lower than the softening temperature of the seal member 11, the face protector can be used without subjecting the seal member 11 to any special treatment after the forming thereof. In this case, the seal member 11 may be subjected to the above described steps of FIGS. 4 (a) through 4 (c) again by another user so that the seal member 11 will be reformed to conform to the contour of the new user's face.

Upon forming of the seal member 11 in conformity with the user's face F, a material such as rubber or closed cell urethane is cut to an annular shape and bonded to both sides of the seal member 11 as the airtight elastic members 12 and 13 (see FIG. 4 (d).

In the foregoing manner, the seal device 10 for the face protector is formed.

According to the seal device 10, since a material which is softened at a relatively low heating temperature and hardens at room temperature such as a shape memorizing resin is used as the seal member 11, the user's own face can be utilized as a mold for forming the seal member 11 and a complete fitness of the seal member 11 to the user's face can be achieved.

If this seal device 10 is attached to the edge of a conventional face protector in a sealed state through the airtight elastic member 12, the face protector can be used in a complete fitness to the user's face.

The seal device 10 is secured to the face portector main body 14 (FIG. 4 (e) by bonding the airtight elastic member 12 to the edge of the face protector main body 14 whereby making of the half face mask 15 as the face protector is completed.

In the face protector having the seal device 10, the space between the face protector and the seal device 10 is sealed airtightly by the airtight elastic member 12 regardless of the contour of the face protector main body 14 and the space between the seal member 11 formed in three dimensions in conformity with the contour of the user's face is sealed airtightly by the airtight elastic member 13 so that the face protector can be used in a complete fittness with the user's face.

Since the seal member 11 is formed in three dimensions to conform to the user's face, some freedom is afforded by the provision of the airtight elastic members 12 and 13 when the face protector is worn by the user so that an adequate sealed state can be maintained even if the user talks in the face protector or his beard has grown.

In the above described embodiment, a half face mask is used as the face protector and description has been made about the seal device used for this half face mask and method for forming the same. The invention however is not limited to the application to the half face mask but it may be applied to also a full face mask covering not only the user's mouth and nose but his eyes.

The invention is also applicable to respiratory system protectors including a dust proof mask, a gas mask, an air supply mask, an air respirator and an oxigen respirator and other protectors including a shading protector, eye protecting glasses for welding etc. which must be used in a fitted state with respect to the user's face. The seal member may be prepared in a plate-like or strap-like state and in a size corresponding to the portion of the user's face which the seal device is expected to cover.

As the seal member, any material that can be softened at a temperature which the user does not feel is too hot when the material is placed on the user's face and hardens at room temperature can be used. Thus, not only a shape memorizing resin but a shape memorizing metal or other material may be used.

The mold used for forming the seal member is not limited to the above described embodiment in which the user's face is utilized directly as the mold but the user's face may be used as a primary mold for forming a secondary mold and the seal member may be formed after the secondary mold. The mold may have the same projections and depressions as the user's face or may have reverse projections and depressions.

What is claimed is:

1. A seal device for a face protector used in a state fitted closely to a user's face comprising:
    a seal member made of a material which is rigid at room temperature and is softened when heated at a temperature within a range from 40° C. to 65° C. and having a shape formed in situ against and in substantial exact conformity with the user's face by placing the heated and softened material of the seal member directly on the user's face in direct contact therewith;
    an airtight elastic member provided between the seal member and the face protector; and
    an airtight elastic member secured to the surface of the seal member on the side of the user's face.

2. A seal device as defined in claim 6 wherein said face protector is a half face mask.

3. A face protector having the seal device according to claim 6 mounted on a face protector main body which is worn by a user in a state fitted to the user's face.

4. A method for forming a seal device for a face protector comprising steps of:
    heating, at a temperature within a range from 40° C. to 65° C., a material which is rigid at room temperature and is softened when heated at a temperature within said temperature range;
    placing the heated and softened material of the seal member directly on a user's face in direct contact with the face and manually forming the material into a seal member in situ against and in substantial exact conformity with the contour of the user's face and cooling the seal member until it hardens; and
    securing airtight elastic members on both sides of the seal member.

5. A method for forming a seal device for a face protector as defined in claim 7 wherein said material for the seal member is a shape memorizing resin.

6. A method of forming a face protector comprising the steps of:
    providing a substantially triangularly shaped seal member frame peripherally bounding a substantially triangular opening;

the seal member frame being made of a material which is rigid at room temperature and is softened when heated at a temperature within a range from 40° C. to 65° C.;

heating the material of the seal member frame to a temperature within the range from 40° to 65° C. resulting in the softening thereof;

placing the heated and softened material of the seal member frame directly on a user's face in direct contact with the face and manually forming the seal member material in situ against and in substantial exact conformity with the contour of the user's face;

and cooling the seal member frame until it hardens.

* * * * *